July 30, 1968
R. F. GILL ET AL
3,394,450
METHOD FOR COATING THE INSIDE OF CONTINUOUSLY WELDED PIPE
Filed Jan. 25, 1965
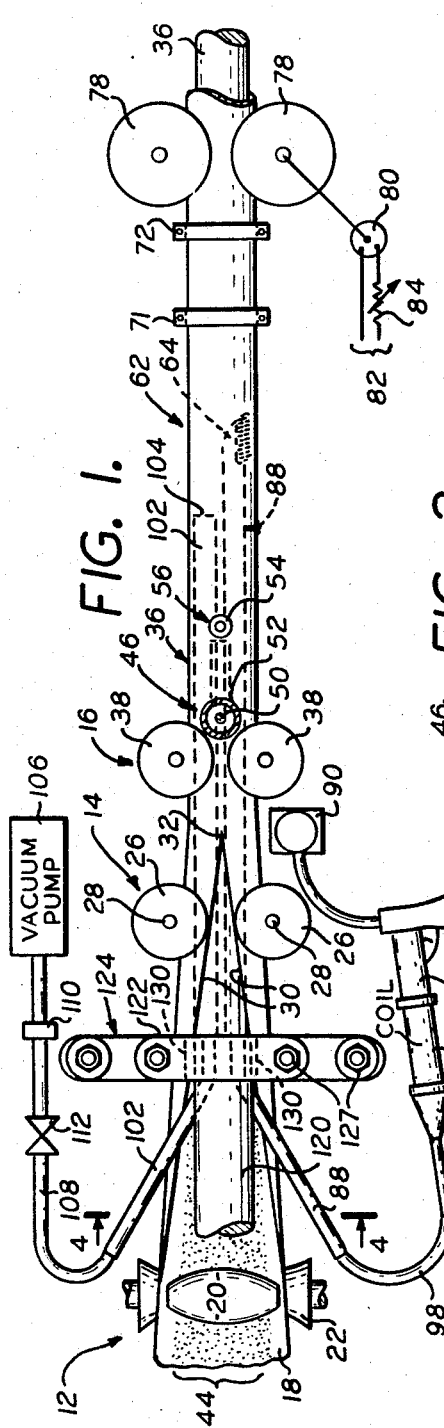
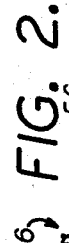
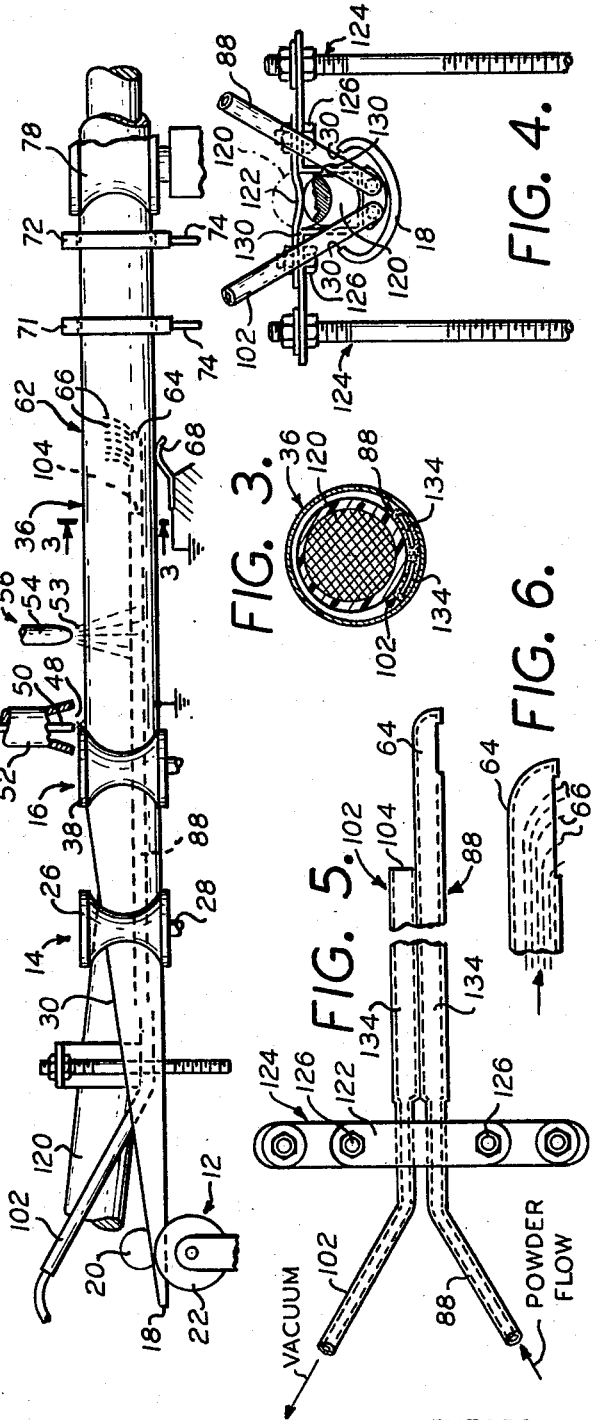
INVENTORS
ROGER F. GILL
ROBERT W. LARSON
BY Emery, Whittemore,
Sandoe & Graham
ATTORNEYS.

United States Patent Office 3,394,450
Patented July 30, 1968

3,394,450
METHOD FOR COATING THE INSIDE OF CONTINUOUSLY WELDED PIPE
Roger Francis Gill, Ridgefield, and Robert William Larson, Avenel, N.J., assignors to General Cable Corporation, New York, N.Y., a corporation of New Jersey
Filed Jan. 25, 1965, Ser. No. 427,779
7 Claims. (Cl. 29—430)

ABSTRACT OF THE DISCLOSURE

Method of coating the inside surface of a tube, pipe, or the like as the tube is formed progressively from a strip of metal by bringing the longitudinal edges of the strip together to form a seam and welding the seam, which method includes directing a stream of coating material in powdered form into a space adjacent the inside surface to be coated, imparting an electrostatic charge to the particles of powder, imparting to the adjacent tube surface to be coated a polarity that causes particles of the powder to adhere to the inside surface of the tube, heating the tube and fusing the powder to form a continuous coating on the parts of the inside surface to be coated, and cooling the coating to leave a continuous coating layer on the inside surface of the tube.

Background and summary of the invention

This invention relates to the coating of the inside of welded pipe. The invention is more particularly concerned with the coating of continuously welded pipe as a part of the forming and welding operation. The preferred embodiment of the invention applies a coating as an electrostatic spray of powder on the inside of the pipe, and then fuses the powder.

The invention will be described as applied to pipe; but the term "pipe" as used herein is synonymous with "tube" and with "conduit."

It is an object of the invention to provide an improved method for coating the inside of pipe, and one that is suitable for use with a continuous pipe-forming and welding operation. Another object is to supply the coating material to the inside of the pipe in the form of powder, and to make the powder stick to the metal of the pipe by imparting an electrostatic charge to the powder while having the pipe brought up to a potential that causes the powder to be attracted to, and to adhere to, the metal of the pipe. In the preferred embodiment the powder is given a positive electrostatic charge and the pipe is grounded.

Another object is to form and weld a pipe by a continuous process and to apply coating material to the inside of the pipe beyond the welding station and through a supply line that is introduced into the pipe at a location ahead of the weld and where the edges of the seam are sufficiently separated to permit admission of the supply line. Beyond the location at which the coating is applied, the pipe is heated to fuse the coating and to cause a permanent adherence of the coating to the metal. Another object is to spray powdered coating material against an inside surface of a pipe with the powder carried by a gas stream, and to prevent build-up of gas pressure within the pipe by having an exhaust gas passage with its inlet near the location at which the powder is supplied, and with a pump for withdrawing gas from within the pipe at substantially the same rate that it is supplied as a carrier for the powder.

The invention is particularly applicable to pipes which are made of strip metal that has a pre-applied non-corrosive coating on its inside surface across the entire width of the strip except the edge portions which are subject to high heat during a welding step. This invention provides a method and apparatus for applying coating across the inside of the weld and across the edge portions not covered by the pre-coating so that the final pipe has a continuous circumferential coating of non-corrosive material on its inside surface.

Other objects, features and advantages of the invention will appear or be pointed out as the description proceeds.

Brief description of the drawing

In the drawing, forming a part hereof, in which like reference characters indicate corresponding parts in all the views:

FIGURE 1 is a diagrammatic top plan view showing apparatus for making welded pipe and introducing a core of cable into the pipe in accordance with this invention;

FIGURE 2 is a side elevation view of the apparatus shown in FIGURE 1;

FIGURE 3 is an enlarged sectional view, taken on the line 3—3 of FIGURE 2;

FIGURE 4 is a sectional view taken on the line 4—4 of FIGURE 1;

FIGURE 5 is a top plan view of the apparatus shown in FIGURE 4 without the pipe; and FIGURE 6 is an enlarged detail view of the nozzle for delivering powder to the inside of the pipe.

Description of preferred embodiment

FIGURES 1 and 2 show roll stands 12, 14 and 16 of a pipe-forming and welding mill. A flat strip of metal 18 goes through the first roll stand 12, which is a breakdown pass with a convex upper roll 20 and a concave lower roll 22 for giving the strip of metal 18 its initial curvature.

The metal 18 forms progressively as it travels from the roll stand 12 to the subsequent roll stand 14 where it passes between rolls 26 disposed on parallel vertical axles 28. Edges 30 of the strip of metal 18 bend upwardly and inwardly toward one another as the pipe is formed; and the edges 30 are brought into substantial contact with one another at a butt seam 32 as the forming of the metal strip 18 approaches completion. The formed pipe is designated by the reference character 36. The edges may be in actual contact with one another as the pipe 36 passes between rolls 38 of the roll stand 16; or the edges 30 may be slightly separated to leave a kerf for more rapid heating of the confronting edge faces, depending upon the method of welding which is used and the thickness of the metal which is being welded. The particular welding technique forms no part of this invention and any known technique can be used.

If the weld is made by electric arc welding or other rapid heating, which does not highly heat the metal for any substantial distance beyond the seam edges 30, then the strip of metal 18 is preferably precoated across most of its width prior to forming. FIGURE 1 shows a wide area of the strip of metal 18 covered by coating 44 which is a non-corrosive material and preferably a thermoplastic plastic, such as polyethylene and acrylic acid-ethylene copolymer which have low specific inductive capacity, or vinyl compounds with low plasticizer level which also have low specific inductive capacity.

In the region of the roll stand 16, and preferably just beyond the bite of the roll stand 16, the pipe 36 passes through a welding station designated generally by the reference character 46. At this welding station 46 the seam is heated by an electric arc 48, projected against the pipe by an electrode 50 located in a hood 52 which flows an atmosphere of argon or other inert shielding gas over the surface of the pipe during the welding operation.

As the pipe 36 travels, with continuous motion, beyond the welding station 46, it passes under a water spray 53 projected from a nozzle 54 at a cooling station 56. This cooling of the pipe shortly after the welding operation prevents heat from the weld from traveling back through the walls of the pipe to the area that is covered by the precoating 44. Moderate heating of the precoating would merely fuse it, but excessive heating would damage the precoating 44.

Beyond the cooling station 56, the pipe 36 travels past a coating station 62 at which there is a nozzle 64 located in the pipe in position to blow streams 66 of gas and entrained powder against the inside surface of the pipe 36.

The nozzle 64 preferably has its outlet orifices directed with both circumferential and axial components so that the streams 66 are projected upwardly along helical paths that carry the entrained powder transversely across the uncoated portions of the pipe on either side of the seam and across the inside of the seam. The powder from the nozzle 64 preferably has an electrostatic charge and the pipe 36 is brought up to a potential which causes the powder in the streams 66 to adhere to the metal of the pipe wall where the metal is still uncoated.

The powder is preferably given a positive electrostatic charge, by apparatus which will be described, and the pipe is preferably grounded by a brush 68 in contact with the outside of the pipe. This brush 68 is merely representative of means for imparting a potential to the pipe for causing the electrostatically charged powder particles in the stream 66 to stick to the uncoated metal of the pipe wall.

In order to have the powder coat acceptably, the particle size must be small. For the materials mentioned above, a particle size in the range of 80 to 200 mesh, United States Bureau of Standards Sieve Series, (approximately 75 to 200 microns), is desirable. The range of size can be extended to somewhat larger particles up to about 50 mesh (approximately 300 microns) by impressing a negative voltage on the pipe with respect to a positively charged conductor within the pipe, though the apparatus shown in the drawing is easier to use.

A short distance beyond the nozzle 64, there are heaters 71 and 72 which are preferably ring burners that direct gas jets against the outside of the pipe; these burners 71 and 72 being supplied with fuel gas through pipes 74. The heat from the burners 71 and 72 fuses the powder inside the pipe and fuses the portion of the precoat 44 where it meets the powder layer so as to obtain a continuous, homogeneous coating around the entire inside surface of the pipe when the coating cools after passing beyond the heaters 71 and 72.

Feed rolls 78 grip the pipe 36 beyond the gas heaters 71 and 72 for advancing the pipe at a uniform, controlled speed. The rolls 78 are driven by a motor 80 supplied with current from a power line 82 and the speed of the motor is regulated by a speed controller 84, this apparatus being merely representative of means for advancing the pipe at a uniform, controlled speed. It will be understood that some or all of the rolls of the other roll stands may be power-driven.

The nozzle 64 is located at the end of a supply line 88 which extends lengthwise of the pipe 36 to a region between the roll stands 12 and 14 where the edges of the seam are spaced widely enough apart to permit the supply line 88 to extend upwardly and out of the pipe. Compressed gas for the supply line 88 comes from a compressed gas reservoir 90 through a spray gun 92 in which the coating powder is entrained in an air stream from the reservoir 90. Such powder spray guns are well known in the art and no detailed illustration or description of the spray gun 92 is necessary for a complete understanding of this invention.

At the discharge end of the spray gun 92, there is an electric coil 94 which creates a high voltage field through which the powder from the spray gun passes and by which the powder is given an electrostatic charge. As the powder leaves the high voltage field in the coil 94, it flows through a tapered reducer 96 and into a hose 98 which conducts the air stream and entrained powder to the inlet end of the supply line 88.

In order to prevent build-up of gas pressure in the pipe 36 at the region of the nozzle 64, there is a pressure relief or exhaust tube 102 located in the pipe with an inlet opening 104 located in the region of the nozzle 64.

The exhaust line 102 extends lengthwise of the pipe 36 and comes out of the pipe at a location near the one where the supply line 88 comes out of the pipe. A vacuum pump 106 is connected with the downstream end of the exhaust line 102 by tubing 108. There is a filter 110 ahead of the vaccum pump 106 for filtering out any powdered coating material which comes out of the pipe with the exhaust gas.

In order to control the pressure within the pipe at the region of coating, it is desirable to have an accurate control on the rate at which gas is withdrawn from the pipe through the exhaust line 102. This control is obtained, in the illustrated embodiment of the invention, by a bleed valve 112 in series with the vacuum pump 106. The bleed valve 112 is adjustable to control the flow rate through the exhaust line 102 and tubing 108.

One of the important uses of the invention is in applying a sheath to the outside of an electric cable 120. In the illustrated construction, the cable 120 is fed into the forming pipe 36 at a location between the roll stands 12 and 14; and there is a hold-down strap 122 attached to supporting means 124 (FIGURE 4) by bolts 126. This hold-down strap 122 bears against the top surface of the cable 120; and there are restraining guides 130 below the strap 122 in position to center the cable 120 transversely in the pipe. These restraining means 130 are also attached to the supporting means 124.

The portions of the supporting means 124 which contact with the cable 120 are made vertically adjustable for regulating them with respect to the forming tube comprising the bent strip of metal 18. This adjustment is obtained by having nuts 127 adjustable along threads of vertical portions of the supporting means 124.

The cable 120 advances at the same speed as the pipe 36 and is enclosed within the pipe as the pipe forms; but the cable 120 must have a cross section somewhat less than the inside cross section of the pipe 36 so as to leave some clearance in the pipe for the supply line 88 and the exhaust line 102. Both of these lines 88 and 102 are made with flattened cross sections along end portions 134 so as to obtain reduced radial dimension while still maintaining the inside cross section necessary for the flow of gas through the supply line and exhaust line. The cable 120 rests on the flat portions 134 of the supply and exhaust lines, and the top of the cable 120, when so supported, is preferably spaced from the weld so as to avoid overheating the insulation on the cable 120.

This invention can be used to apply all of the inside coating to the pipe; but where a cable is to be introduced into the pipe, as shown in the drawing, it is advantageous to have the bottom part of the inside wall of the pipe precoated so that the cable can rest on it after passing the powder discharge nozzle 64 and prior to the application of heat to soften and congeal the powdered coating material. It will be understood that flame jets from the ring burners 71 and 72 are confined to those portions of the circumference of the pipe where heat is necessary to soften, fuse and/or coalesce the powdered coating material within the pipe.

The preferred embodiment of the invention has been illustrated and described, but changes and modifications can be made and some features can be used in different combinations without departing from the invention as defined in the claims.

What is claimed is:

1. The method of coating the inside surface of a tube progressively as the tube is formed which comprises directing a stream of coating material in powdered form into a space adjacent to the inside surface to be coated, imparting an electrostatic charge to the particles of powder, imparting to adjacent material in the tube a polarity that causes particles of the powder to adhere to the inside surface of the tube, heating the tube and fusing the powder to form a continuous coating on the parts of the surface to be coated, and cooling the coating to leave a solid coated layer on the inside surface of the tube, characterized by forming the tube progressively from a strip of metal that is precoated with corrosive-resistant material across most of the width of the strip on the surface of the strip that forms the inner surface of the tube, the coating terminating short of the longitudinal edges of the strip, bringing the edges together to form a longitudinal seam, welding the seam, and coating the remainder of the inside surface adjacent to and across the weld by the electrostatically charged powder.

2. The method described in claim 1 characterized by supplying the powdered material to the inside surface of the tube at a distance beyond the weld and after the weld is completed.

3. The method described in claim 2 characterized by cooling the weld before applying the powdered material, and then subsequently heating the pipe to coalesce the powder into a continuous coating.

4. The method described in claim 1 characterized by progressively bringing the edges of the strip together to form the tube, and feeding into the forming tube a cable for which the tube serves as a sheath.

5. The method described in claim 4 characterized by maintaining a clearance between the cable and the wall of the tube, maintaining a powder supply line in the tube in said clearance, and projecting the powder from the end of the powder supply line with a stream of gas as a carrier for the powder.

6. The method described in claim 5 characterized by exhausting gas from within the tube at substantially the same rate as the gas flows into the tube with the powder, and localizing the region from which the gas is exhausted by maintaining a reduced pressure at the inlet end of an exhaust line that extends through the clearance to a location near the discharge end of the powder supply line.

7. The method described in claim 4 characterized by forming a butt seam where the edges come together, welding the butt seam, and maintaining the cable out of contact with the powder-coated area of the inside of the pipe until after the powder has been heated to coalesce it and cooled to bring it to a solid condition.

References Cited
UNITED STATES PATENTS

| | | | |
|---|---|---|---|
| 3,089,196 | 5/1963 | Knapp et al. | 18—47.5 |
| 3,122,114 | 2/1964 | Kringel et al. | 29—200 |
| 3,248,791 | 5/1966 | Powers | 29—46 |
| 3,256,592 | 6/1966 | Krengel et al. | 29—200 |
| 3,226,817 | 1/1966 | Somborg et al. | 29—43 |

THOMAS H. EAGER, *Primary Examiner.*